(12) United States Patent
Duvoisin et al.

(10) Patent No.: US 11,357,243 B2
(45) Date of Patent: Jun. 14, 2022

(54) SYSTEM AND METHOD FOR THE ELECTROMAGNETIC ENERGIZING OF PACKAGED CONTENT AND CORRESPONDING DEVICE

(71) Applicants: Charles Adriano Duvoisin, Sao Bento do Sul (BR); Fabio Eduardo Baggio, Curitiba (BR)

(72) Inventors: Charles Adriano Duvoisin, Sao Bento do Sul (BR); Fabio Eduardo Baggio, Curitiba (BR)

(73) Assignees: Charles Adriano Duvoisin, Sao Bento do Sul (BR); Fabio Eduardo Baggio, Curitiba (BR)

( * ) Notice: Subject to any disclaimer, the term of this patent is extended or adjusted under 35 U.S.C. 154(b) by 208 days.

(21) Appl. No.: 16/315,389

(22) PCT Filed: Jul. 4, 2016

(86) PCT No.: PCT/BR2016/050154
§ 371 (c)(1),
(2) Date: Jan. 4, 2019

(87) PCT Pub. No.: WO2018/006141
PCT Pub. Date: Jan. 11, 2018

(65) Prior Publication Data
US 2019/0174801 A1 Jun. 13, 2019

(51) Int. Cl.
*A23L 3/32* (2006.01)
*B01J 19/12* (2006.01)
(Continued)

(52) U.S. Cl.
CPC ............... *A23L 3/32* (2013.01); *A23C 3/00* (2013.01); *A23C 3/023* (2013.01); *A23L 2/50* (2013.01);
(Continued)

(58) Field of Classification Search
CPC ..... A23L 3/32; A23L 2/50; A23L 5/20; A23L 3/26; A23L 3/34095; A23L 3/325;
(Continued)

(56) References Cited

U.S. PATENT DOCUMENTS 5,048,404 A 9/1991 Bushnell et al.
5,288,401 A 2/1994 Rodriquez
(Continued)

FOREIGN PATENT DOCUMENTS

BR 102014019135 A2 2/2016
BR 102013017403 A2 7/2016
(Continued)

OTHER PUBLICATIONS

PCT International Search Report and Written Opinion dated Apr. 3, 2017 in corresponding Application No. PCT/BR2016/050154, 14 pages.
(Continued)

*Primary Examiner* — Xiuyu Tai
(74) *Attorney, Agent, or Firm* — Dilworth IP, LLC

(57) ABSTRACT

A system and method for the electromagnetic energization of packed content, in which the system includes at least one container filled with at least one fluid, at least one energization element, at least one grounding element, at least one containment element, one or more alignment elements, one or more contact elements, at least one grounding connection element, at least one grounding element, and optionally at least one movement element. Additionally, a corresponding apparatus is provided.

9 Claims, 8 Drawing Sheets

(51) Int. Cl.
*C02F 1/48* (2006.01)
*B67C 7/00* (2006.01)
*A23C 3/023* (2006.01)
*H05B 6/46* (2006.01)
*H05B 6/54* (2006.01)
*A23C 3/00* (2006.01)
*A23L 2/50* (2006.01)

(52) U.S. Cl.
CPC ............... *B01J 19/12* (2013.01); *B67C 7/00* (2013.01); *C02F 1/48* (2013.01); *H05B 6/46* (2013.01); *H05B 6/54* (2013.01); *A23V 2002/00* (2013.01); *B01J 2219/0877* (2013.01); *B01J 2219/12* (2013.01)

(58) Field of Classification Search
CPC .. A23C 3/00; A23C 3/023; B01J 19/12; B01J 2219/0877; B01J 2219/12; B67C 7/00; B67C 7/0086; B67C 2003/227; B67C 2003/228; C02F 1/48; H05B 6/46; H05B 6/54; A23V 2002/00; A61L 2/14; A61L 2202/11; A61L 2202/16; A61L 2/035; A61L 2/202; A61L 2/26; A23B 7/015; A23K 30/00; A23K 50/42; B05D 3/06; B05D 3/067; B41J 3/4073; B41J 11/002; B65B 55/08; B65B 55/02; B65B 55/04; Y02E 60/36
See application file for complete search history.

(56) References Cited

U.S. PATENT DOCUMENTS

| | | |
|---|---|---|
| 5,925,292 A | 7/1999 | Ziesenis |
| 6,164,332 A | 12/2000 | Hatton |
| 6,667,007 B1 | 12/2003 | Schmidt |
| 7,472,651 B2 | 1/2009 | Isono et al. |
| 2004/0047762 A1* | 3/2004 | Masaoka ............ A61L 2/14 |
| | | 422/22 |

FOREIGN PATENT DOCUMENTS

| | | |
|---|---|---|
| CN | 102757150 A | 10/2012 |
| JP | H03-98565 A | 4/1991 |
| WO | 2010053844 A1 | 5/2010 |
| WO | 2014053865 A1 | 4/2014 |

OTHER PUBLICATIONS

Yamamoto et al., S. Sterilization by $H_2O_2$ droplets under corona discharge, Journal of Electrostatics 56 (2002) 173-187.

Tsukamoto, J., Inactivation Effect by Pulsed Electric Field Application under Orange Juice, Brazilian Journal of Agroindustrial Products, Campina Grande, v. 9, n. 1, p. 45-52, 2007.

* cited by examiner

SYSTEM AND METHOD FOR THE ELECTROMAGNETIC ENERGIZING OF PACKAGED CONTENT AND CORRESPONDING DEVICE

FIELD OF APPLICATION

The present invention belongs to the field of treatment, purification and modification of fluid characteristics by means of electromagnetic fields and physicochemical processes.

INTRODUCTION

The present invention refers to a system and method for energization of packed content, notably fluids and/or conductive solids packed in containers made of insulating material or coated with insulating material, by means of inserting an electrode in the fluid, establishing an electron current between the fluid and the external grounding of the container, abruptly removing the grounding and subsequently trapping the free electrons in the container/fluid.

The method according to the invention can be applied to the fluid in its final package, preferably post-packing, with no need for intermediate storage, drastically reducing the risks of contamination, as well as preventing any alteration to temperature or volume of said fluid.

The present invention also relates to a device for energization of packed content.

STATE OF THE ART

Several solutions are known from the state of the art, intending to promote the energization or activation of fluids, the energization of fluids intended for use and/or human and/or animal consumption being of particular interest herein.

An example in the state of the art is the "water charging machine" of U.S. Pat. No. 5,925,292, which discloses a machine for water charging, in which the water to be treated is moved alternately (upwardly and downwardly) in a set of vortexes, introducing oxygen into the water stream to provide an extension of shelf life (storage time) by incorporation of gaseous oxygen and, eventually, by exposing the water to a negative or positive magnetic field and a piezoelectric field, to create a substantial zeta potential.

The problem with the concept in U.S. Pat. No. 5,925,292 is precisely the complexity of the solution, as it requires sophisticated and costly water guiding elements and the use of booster pumps, magnets and piezoelectric crystals.

Additionally, the solution above seems to predominantly focus on oxygenation or "aeration" of the fluid rather than a more genuine form of energization, and ultimately requires circulation or movement of the fluid, which leads to the fluid coming into contact with several elements and materials, increasing the risk of fluid contamination.

A form similar to the aforementioned solution is disclosed by the U.S. Pat. No. 6,164,332, which is an apparatus for the manufacture of water magnetism aligned to the flow. The disadvantages or omissions of this patent are the same as the solution in U.S. Pat. No. 5,925,292.

Other relevant documents are the patent documents U.S. Pat. No. 5,288,401, CN 102757150 and WO 2014053865, among others, which also present drawbacks similar to those mentioned above and, in addition, include the disadvantage of only being suitable for large-scale batch applications, without envisioning fluids already packed and in their final package.

As shown from the description of the state of the art, there is space and demand for a system and method capable of providing easy and safe energization of fluids, notably in their final package, without influencing their quality.

OBJECTIVES OF THE INVENTION

Therefore, one of the objectives of the present invention is to provide a system for energization of packed content, according to the features of claim 1 in the appended set of claims.

Another objective of the present invention is to provide a method for energization of packed content, according to the features of claim 8 in the appended set of claims.

Finally, an objective of the present invention is to provide an apparatus for energization of packed content, according to the features of claim 9 in the appended set of claims.

Other features and details of the features are represented by dependent claims.

BRIEF DESCRIPTION OF THE DRAWINGS

For better understanding and visualization of the object of the present invention, it will now be described with reference to the appended drawings, with the technical effect obtained being represented by means of an exemplary embodiment, which is not limiting to the scope of the present invention, wherein.

DETAILED DESCRIPTION OF THE INVENTION

Figure 3:
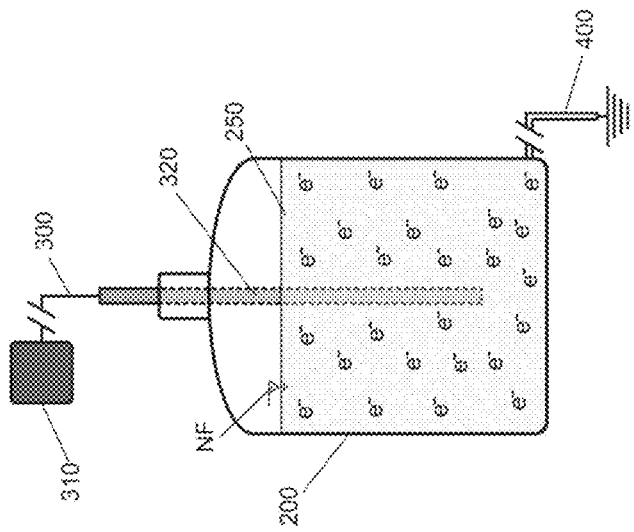
FIG. 3: shows the system according to the invention by the end of the energization operation, with the shutdown of the electric power source and of the grounding for the container.
Figure 2:
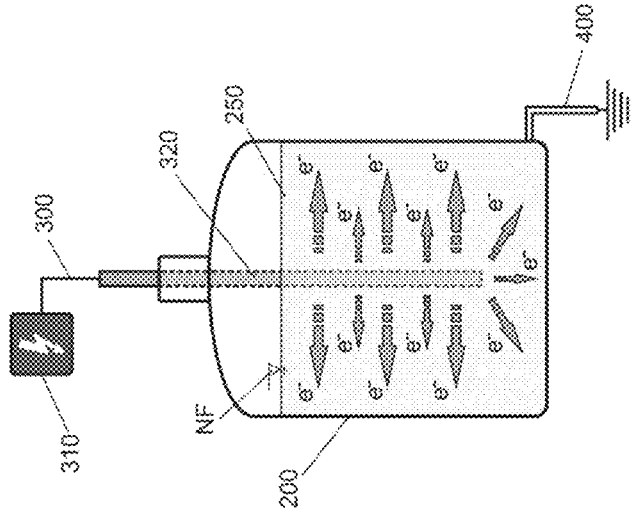
FIG. 2: shows the system according to the invention during the energization operation, with activation of the electric power source and grounding for the container.
Figure 1:
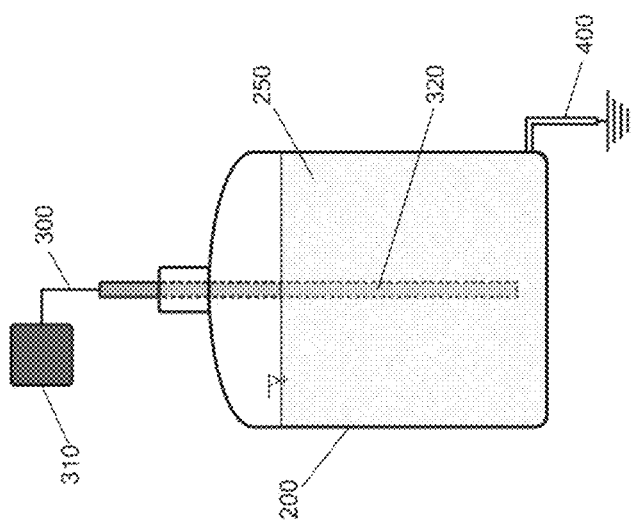
FIG. 1: shows a schematic view of a system according to the invention.
Figure 5:
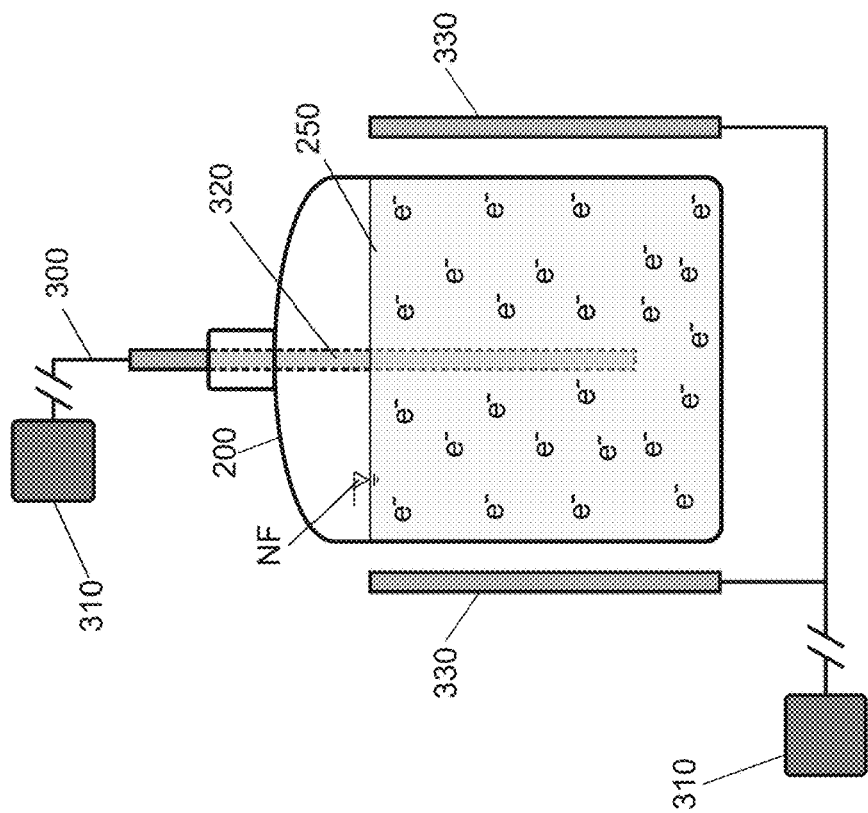
FIG. 5: shows the system according to the invention by the end of the energization operation, with the shutdown of the electric power source and of the coils.
Figure 4:
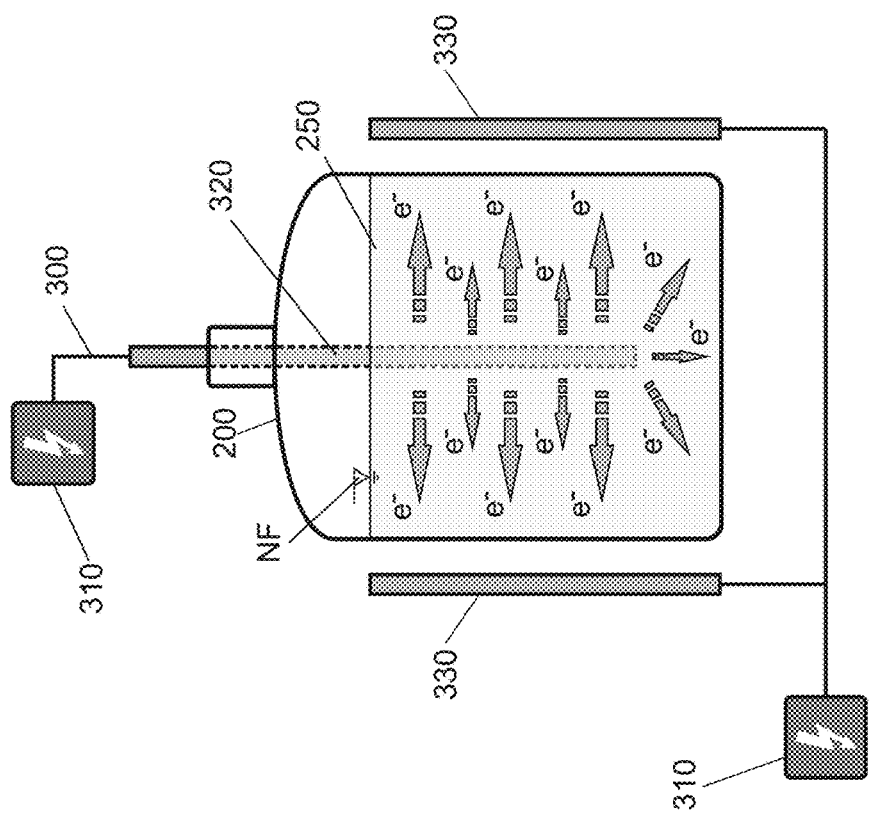
FIG. 4: shows the system according to the invention during the energization operation, with the activation of the electric power source and additional coils.
Figure 7:
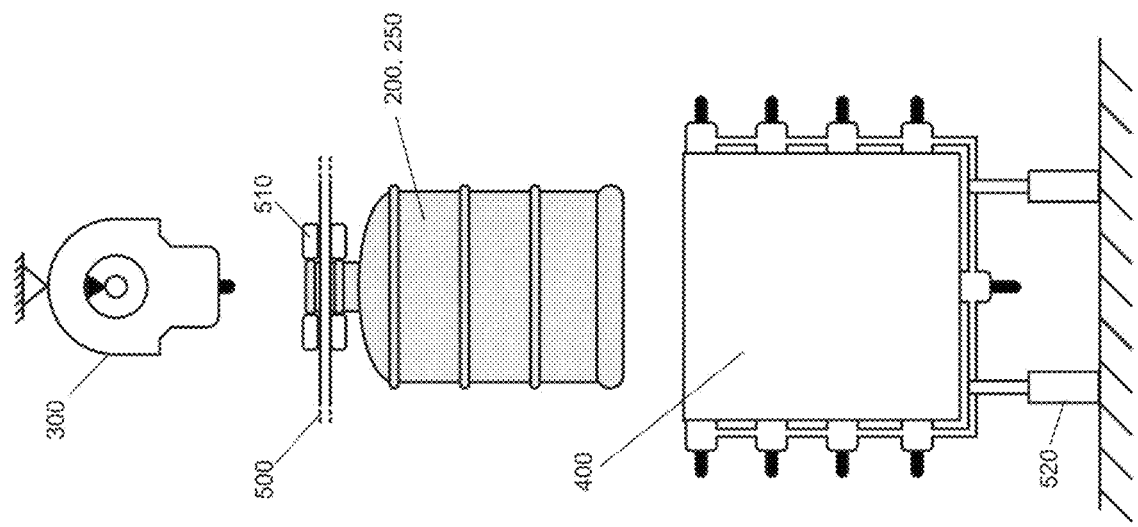
FIG. 7: shows a side view of the components of a system according to the invention, for mineral water containers.
Figure 6:
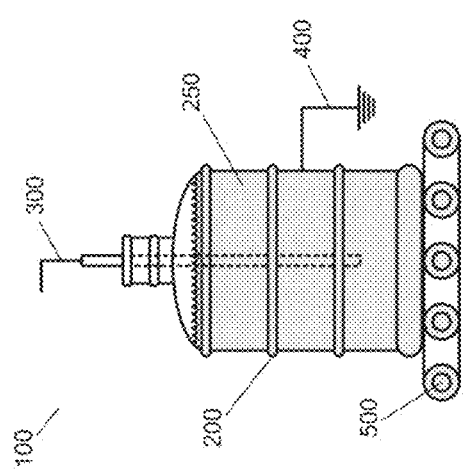
FIG. 6: shows a schematic view of a system according to the invention for use on medium and large scale energization.
Figure 9:
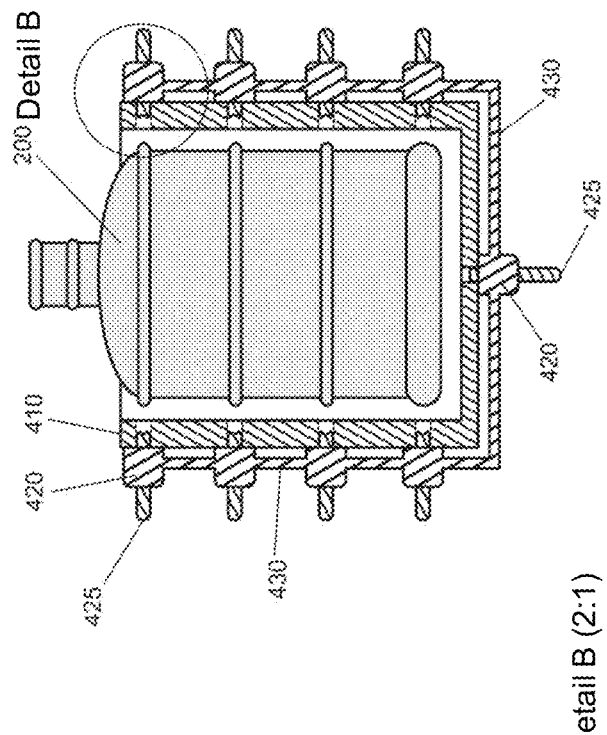
FIG. 9: shows a cross-sectional side view by the A-A line of FIG. 8.
Figure 9A:
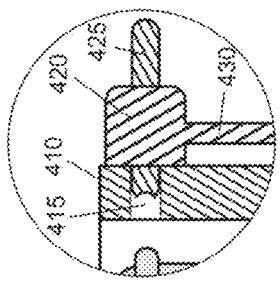
FIG. 9a: shows detail B of FIG. 9, enlarged.
Figure 8:
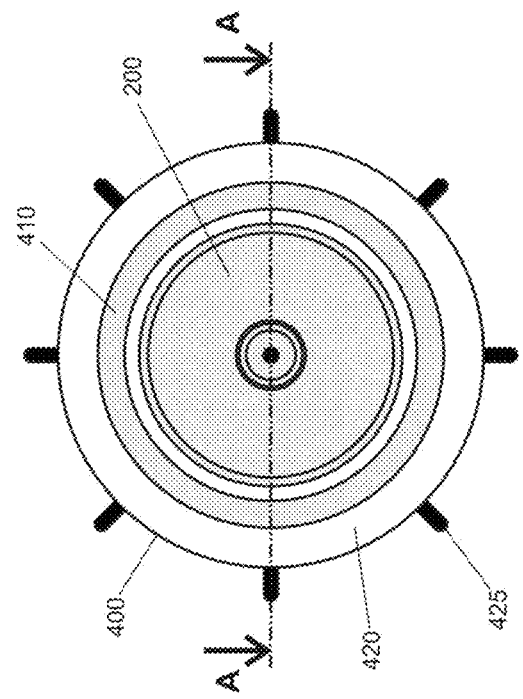
FIG. 8: shows a top view of a grounding unit of the system according to the invention.
Figure 11:
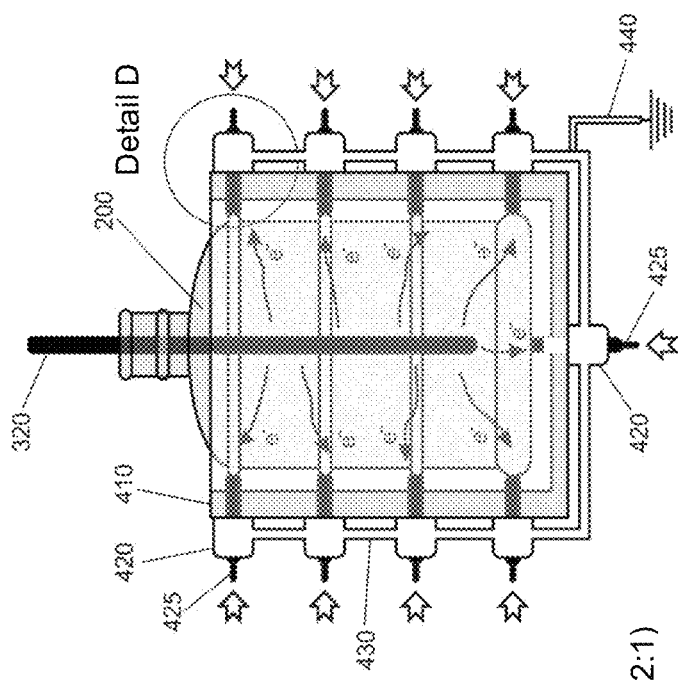
FIG. 11: shows a partial cross-sectional side view of the C-C plane of FIG. 5.
Figure 11A:
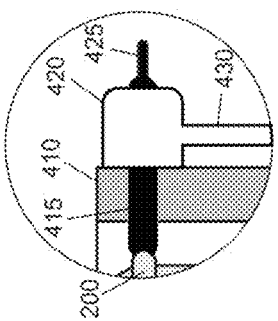
FIG. 11a: shows detail D of FIG. 11, expanded.
Figure 10:
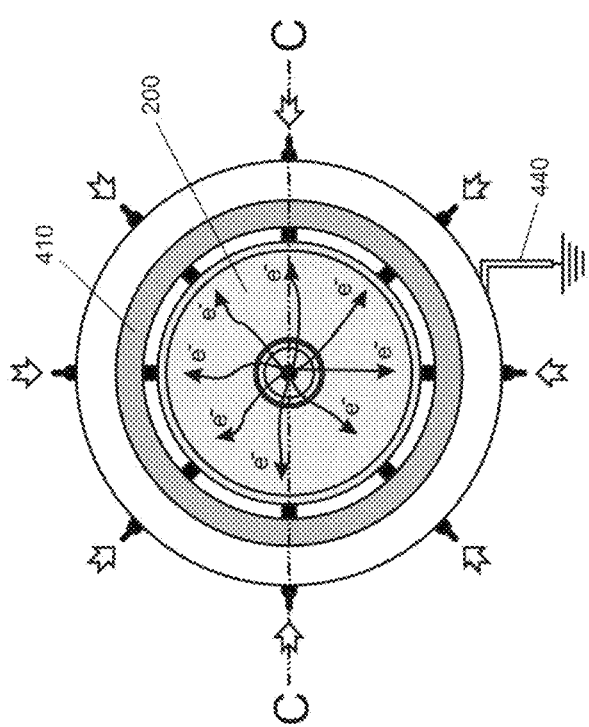
FIG. 10: shows a top view of a grounding unit of the system according to the invention.
Figure 12:
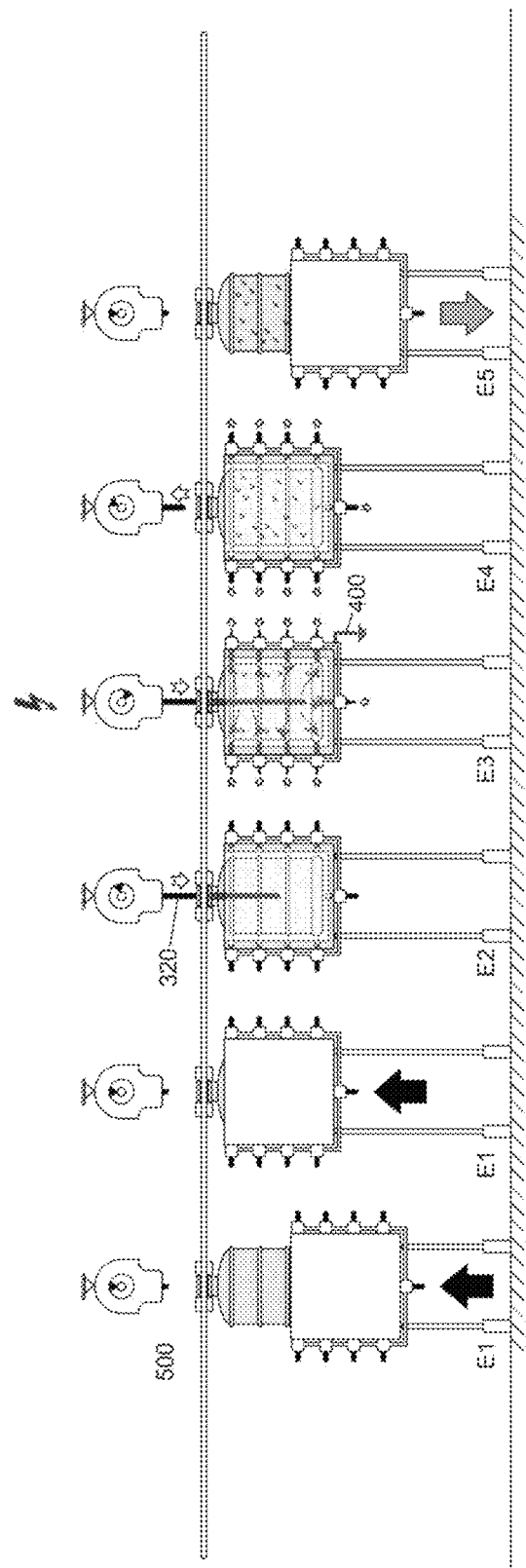
FIG. 12: shows a schematic view of a sequence of steps of the method according to the invention.
Figure 14:
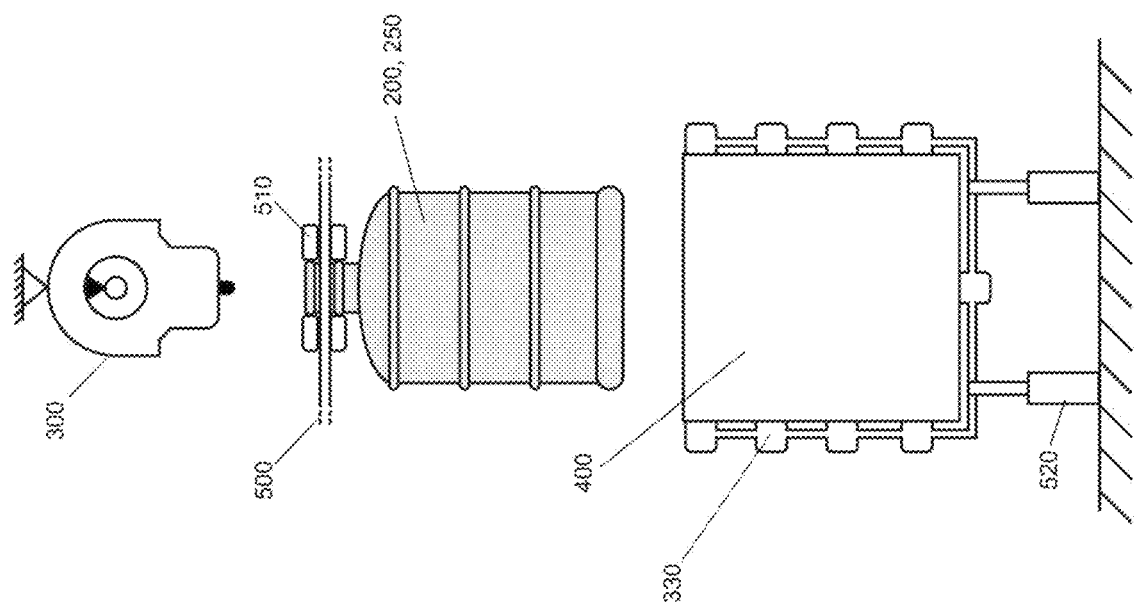
FIG. 14: shows a side view of the components of a system according to the invention, for mineral water containers, with the use of additional coils.
Figure 13:
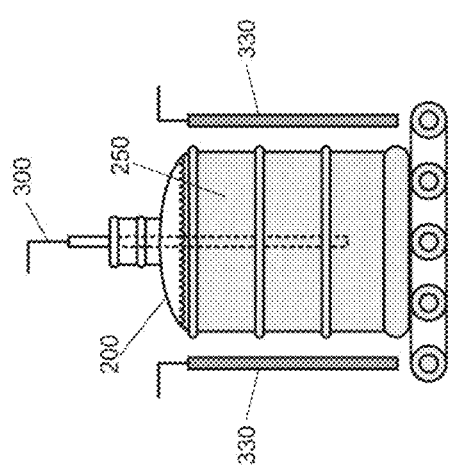
FIG. 13: shows a schematic view of a system according to the invention for use on medium and large scale energization, with the use of additional coils.
Figure 15:
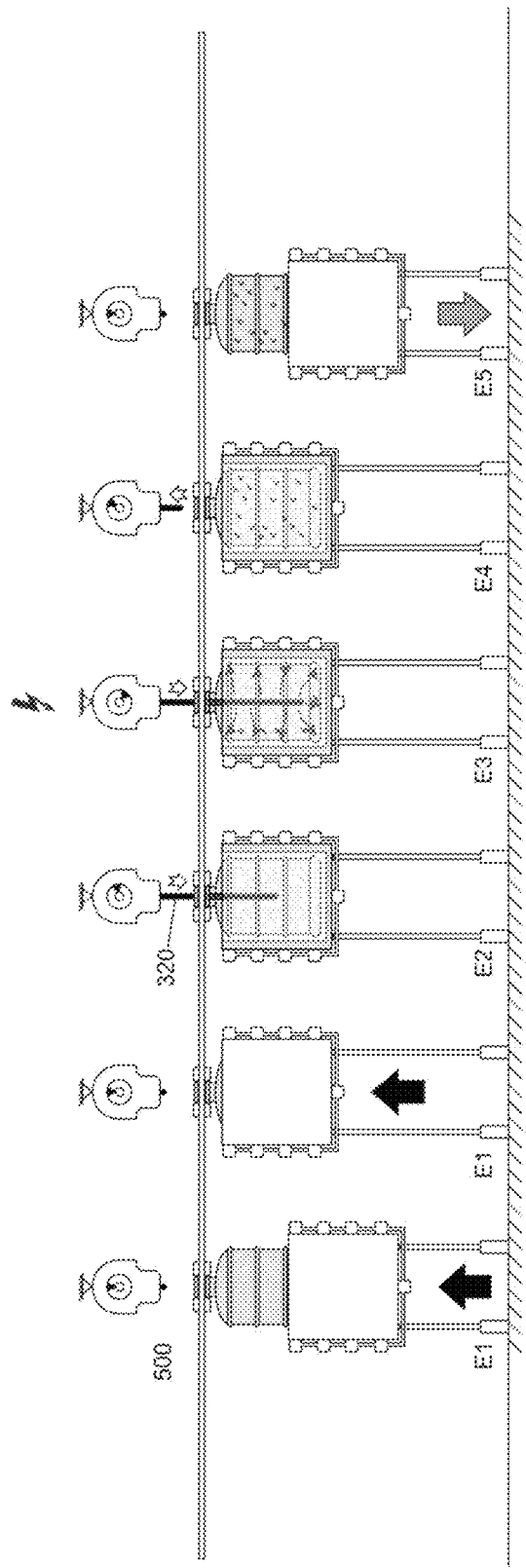
FIG. 15: shows a schematic view of sequence of steps of the method according to the invention, with the use of additional coils.

The detailed description of the invention is in accordance with the above figures, but should not be construed as limiting to them, the following text being divided into system, method and equipment, according to the scope of the claims.

System

The system for energization of packed content, or simply system (100) according to the invention comprises:
(i) container (200);
(ii) fluid (250);
(iii) energization means (300); and
(iv) grounding means (400).

A container (200) according to the invention is a container manufactured in insulating material or coated with insulating material, preferably made of insulating material and having walls with a thickness such as to allow passage of peripheral and/or induced and/or leaked electrical currents at the moment and site of contact with conductive materials other than the fluid (250).

A fluid (250), according to the invention is a conductive fluid, preferably of the type intended for human and/or animal use and/or consumption, packed, selected from the group consisting of water, juices, extracts, concentrates, milk, dairy products, pastes, emulsions, ointments, creams etc.

Energization means (300), according to the invention is an electric power source (310) equipped with at least one electrode (320), as a conductor, connected electrically and/or magnetically to the electric power source (310), to be introduced into the container (200), more specifically, dipped in the fluid (250) for electrification thereof.

It is to be noted that, regardless of the use of electric power source (310) with direct or alternating current, practical tests additional to the research of the present invention have revealed that the higher the applied voltage, the better and more intense is the harmonization of the resulting flow of electrons inside the fluid.

The selection of the intensity of the electrical current follows the same reasoning, that is, higher currents will result in more uniform flow of electrons.

These considerations, however, should not be understood as limiting to the applications of this invention, since the choice of voltage and current levels will depend on the type of fluid chosen, as well as the conditions and characteristics of the fluid or any objects totally or partially submerged therein, and so on.

That being said, the use of both low voltages and currents as well as high voltages and currents should be considered.

Suitable electric power sources (310) according to the invention should enable differences of electric potential between 0 and 10 GV, preferably and not limited to a range between 10 kV and 100 kV. The choice of voltage will depend essentially on the type of fluid (250) to be energized, the desired energization time and whether there are objects dipped in the fluid (250) or not, as well as the dielectric properties of the container (200).

Suitable electric power sources (310) according to the invention should enable electrical currents between 0 and 10 kA, preferably between 0 and 1 kA. The choice of electrical current intensity will depend essentially on the type of fluid (250) to be energized, the desired energization time and whether there are objects dipped in the fluid (250) or not, as well as the dielectric properties of the container (200).

The electrode (320) should be made of conductive material with characteristics appropriate to the voltage and electrical current from the electric power source (310) and that will not contaminate the fluid (250) or any object or element contained in the container (200).

It is important to note the use of additional energization means (300), for example, external coils (330) arranged around the container (200) for induction of electrical current by electromagnetism through the container wall (200), between the electric coils and electrode (320).

When using coils (330), it should be noted that these should result in a polarity different to that of the electrode (320), the grounding means (400) not being necessary here.

A grounding means (400) according to the invention is any suitable form of grounding known in the state of the art, which can be connected and disconnected from the container (200), preferably by external contact with the container (200). The grounding means (400) acts upon contact with the container (200) to ground it during the electrification of the fluid (250) allowing thus for formation of an electrical current between the fluid (250) electrified by the electrode (320) and the electric power source (310).

The grounding means (400) should be made of conductive material with characteristics appropriate to the voltage and electrical current from the electric power source (310) and that will not modify the conditions of the container (200).

It is to be noted that the container (200), if made of insulating material, has adequate thickness to allow for passage of electrical current through the wall of the container (200) to the grounding means (400), otherwise the voltage and/or electrical current should be chosen in order to allow for passage of electrical current through the wall of the container (200).

It is also noteworthy that the arrangement and quantity of grounding means (400) should be chosen in order to allow the best and most homogeneous distribution of electrons possible within the fluid (250). The quantity of grounding means (400) will depend on the dimensions and shape of the container (200), in addition to its dielectric stiffness and the type of fluid (250) in the package, specifically, the quantity of grounding means (400) must be sufficient to allow for uniform distribution of the electrical current throughout the fluid (250) and allow for capture of the largest possible amount of electrons ($e^-$) inside the container (200).

Similar understandings regarding arrangement and quantity are valid regarding the use of coils (330) instead of grounding (400).

With grounding (400) or coils (330), the container (200), being of conductive material or containing parts of conductive material, should be isolated during the energization operation.

System for Medium and Large-Scale Production

The system (100) according to the invention described above allows for energization of fluids (250) in small scale or with low unitary yield, which obviously should not be understood as limiting to the scope of protection of the present invention.

A system (100), according to the invention for energization of content for medium and/or large scales can comprise, therefore:

(i) at least one container (200) filled with at least one fluid (250);

(ii) at least one energization means (300) comprising:
   a. at least one electric power source (310),
   b. at least one electrode (320),
   c. optionally one or more external coils (330);

(iii) at least one grounding means (400) comprising:
   a. at least one containment means (410),
   b. one or more alignment means (420),
   c. one or more contact means (425);
   d. at least one grounding connection means (430) and:
   e. at least one grounding element (440);

(iv) optionally at least one movement means (500) comprising:
   a. at least one transport means (510), In regards to the container (200), fluid (250) and energization means (300), the same description and considerations made for small-scale energization apply.

A grounding means (400) for medium and large scale energization, according to the invention, is equipped with at least one insulated containment means (410), in which one or more alignment means (420) with one or more contact means (425) are attached, all of these being interconnected by a grounding connection means (430) to a grounding element (440).

The containment means (410) is disposed between the container (200) and the alignment means (420).

The alignment means (420) involve the containment means (410) in such a way as to allow for attachment and arrangement of the contact means (425) evenly around the container (200).

The contact means (425) acts upon contact with the container (200) to ground it during the electrification of the fluid (250) allowing thus for formation of an electrical current between the fluid electrified by the electrode (320) and the electric power source (310).

The contact means (425) should be made of conductive material as well as material having characteristics appropriate to the voltage and electrical current from the electric power source (310) and that will not modify the conditions of the container (200).

The system (100) for medium and large-scale energization can still optionally comprise a movement means (500) which, according to a preferred embodiment of invention, can be any transport means (510) capable of moving both the container (200) and transport means (520) capable of moving the grounding means (400) or both.

Additionally, when using one or more external coils (330), they may be incorporated into the containment medium (410) and, when this is the case, the grounding is not necessary.

Operation

As described above, the elements of a system (100) according to the invention comprise a solution for energization of a fluid (250) by capturing the largest possible amount of electrons (e⁻) inside the fluid (250) contained in a container (200).

This capture occurs through submission of the fluid (250) within the container (200) duly grounded by a grounding means (400) to an electrical voltage generated from an energization means (300).

In the case of the use of external coils (330) no grounding means (400) will be present.

The electrical voltage generated in the electric energy source (310) establishes a difference of electric potential inside the fluid (250) and, consequently, an electrical current, that is, a flow of free electrons (e⁻), inside the fluid (250), first between the electrode (320) and the inner wall of the container (200).

After a preset interval of time ($\Delta t$), the grounding means (400) and the electrode (320) are abruptly disconnected from container (200), wherein the electrical current ceases and, therefore, the electrons (e⁻) cease their movement and remain trapped inside the container (200)/fluid (250).

In the case of use of external electrodes (330), after a preset interval of time ($\Delta_t$), the electrode (320) and the external coils (330) are abruptly disconnected from the container (200), wherein the electrical current ceases and, therefore, the electrons (e⁻) ceases their movement and remain trapped inside the container (200)/fluid (250)

Method

The method for energization of packed content, or simply put, method (100) according to the invention comprises the following method steps:

E1) Positioning the container (200) containing the fluid (250) inside the containment means (410) and/or positioning the containment means (410) around the container (200) containing the fluid (250);

E2) establishing electrical contact between the electrode (320) and the fluid (250);

E3a) grounding the container (200) and applying an electrical current during a preset interval of time ($\Delta_t$) to the electrode (320); or E3b) not grounding the container (200) and applying an electrical current during a preset interval of time ($\Delta_t$) to the electrode (320) and to the external coils (330);

E4a) abruptly interrupting the application of the electrical current and disconnecting the grounding of the container (200); or E4b) abruptly interrupting the application of the electrical current to the electrode (320) and the external coils (330); and E5) withdrawing the container (200) and/or distancing the containment means (410).

The performance of step E1 must be in accordance with the conditions of packing, package, dimensions of the final product, type of fluid, etc., and can, therefore, be done by moving the container (200) toward the containment means (410) or by moving the containment means (410) towards the container (200) or both, through one or more appropriate movement means (500).

Step E2 acts primarily in preparing the energization of the fluid by insertion of the energization means (300) on the container (200), more specifically the immersion of the electrode (320) in the fluid (250).

Step E3a acts on the grounding of the container (200) so that the application of the electrical current in the electrode (320) promotes the flow of electrons (e⁻) which is necessary to the energization, object of the present invention.

Step E3b, optional to step E3a, acts on the application of electrical current in the electrode (320) and in the external coils (330) to promote the flow of electrons (e⁻), which is necessary to the energization, object of the present invention.

The application of the electrical current in the electrode (320) and/or the external coils (330) should take place within an interval of time ($\Delta_t$) which must be in accordance with the conditions of package, packing, dimensions of the final product, type of fluid etc.

Step E4a comprises the abrupt interruption of the electrical current and the shutdown of the grounding of the container (200) and the step E4b comprises only the abrupt interruption of the electrical current in the electrode (320) and in the external coils (330). The container (200) being of insulating material or simply insulated by the containment means (410), the abrupt removal of the grounding means (440) (or disconnection of the external coils (330)) will trap or retain the remaining electrons (e⁻) from the energization within the interval of time ($\Delta_t$) in the fluid (250) inside the container (200), thus promoting the energization of the fluid (250).

Step E5 merely acts on the removal of the container (200) and/or the removal of the containment means (410) to finish the energization process.

The new technical effect achieved is the expeditious and sterile increase in the concentration of electrons (e⁻) in the fluid (250), causing an imbalance of electric charges in the atoms of its molecules, namely, the imprisonment of ions with excess (anions) as well as deficit (cations) of electrons (e⁻).

In the case of energized (250) fluid, positive ions migrate to the negative pole of the direct electrical current dipped in the fluid (250), causing a desired excess of hydroxyl ions (OH⁻) or anions and the consequent increase in water alkalinity.

Conclusion

It will be easily understood by those skilled in the art that changes can be made to the present invention without departing from the concepts exposed in the above description. These changes must be regarded as included in the scope of the present invention. Consequently, the particular embodiments previously described in detail are only illustrative and exemplary and are non-restrictive as to the scope of the present invention, to which the full extent of the appended set of claims and any and all correspondents thereof should be given.

The invention claimed is:

1. A system for electromagnetic energization of packed content, the system comprising:
   (i) at least one container filled with at least one fluid;
   (ii) at least one energization means comprising:
      a. at least one electric power source, and
      b. at least one electrode;
   (iii) at least one grounding unit comprising:
      a. at least one containment device containing the at least on container,
      b. one or more alignment devices attached to the at least one containment device,
      c. one or more contacts attached to the one or more alignment devices and aligned by the one or more alignment devices to be in contact with an exterior of the at at least one container for grounding the at least one container,and to be disconnected from contact with the exterior of the at least one container to disconnect grounding of the at least one container,
      d. at least one grounding connector interconnecting the one or more contacts, and
      e. at least one grounding element interconnected with the at least one grounding connector to ground the one or more contacts;
   wherein the system provides energization of the fluid by capturing electrons (e−) inside the fluid, which causes an imbalance of electric charges on atoms of molecules of the fluid, trapping ions with excess (anions) as well as deficit (cations) of electrons (e−).

2. The system according to claim 1, wherein the at least one container made of an insulating material or is coated with the insulating material.

3. The system according to claim 1, wherein the at least one fluid is conductive.

4. The system according to claim 1, wherein the at least one electrode is connected electrically and/or magnetically to the at least one electric power source to be introduced into the at least one container and is dipped in the at least one fluid for electrification thereof.

5. The system according to claim 1, wherein the at least one containment device is an insulating containment device.

6. Equipment for the electromagnetic energization of packed content, comprising an integration of the system according to claim 1.

7. The system according to claim 1, further comprising at least at least one transport device attachable to the at least one container to transport the at least one container.

8. The system according to claim 2, wherein the at least one container is made of the insulating material and has walls with a thickness to allow passage of peripheral and/or induced and/or leaked electrical currents at a moment and site of contact with conductive materials other than the at least one fluid.

9. The system according to claim 3, wherein the at least one fluid is of a type intended for human and/or animal use and/or consumption, packed, and selected from the group consisting of water, juices, extracts, concentrates, milk, dairy products, pastes, emulsions, ointments, and creams.

* * * * *